J. P. MARLIN.
VEGETABLE WASHER.
APPLICATION FILED JUNE 23, 1911.

1,132,597.

Patented Mar. 23, 1915.
2 SHEETS—SHEET 1.

Witnesses

Inventor
John Peter Marlin
By
Attorney

J. P. MARLIN.
VEGETABLE WASHER.
APPLICATION FILED JUNE 23, 1911.

1,132,597.

Patented Mar. 23, 1915.
2 SHEETS—SHEET 2.

Witnesses
J. Milton Jester
V. T. Randolph Jr.

Inventor
John Peter Marlin
By N. A. Gourick
Attorney

UNITED STATES PATENT OFFICE.

JOHN PETER MARLIN, OF SAN LORENZO, CALIFORNIA.

VEGETABLE-WASHER.

1,132,597.        Specification of Letters Patent.      Patented Mar. 23, 1915.

Application filed June 23, 1911. Serial No. 634,921.

*To all whom it may concern:*

Be it known that I, JOHN PETER MARLIN, a citizen of the United States, residing at San Lorenzo, in the county of Alameda and State of California, have invented certain new and useful Improvements in Vegetable-Washers, of which the following is a specification.

My invention relates to devices for washing vegetables such as rhubarb, asparagus, celery and other stalks and roots used for food, and has for its object the provision of a machine that will thoroughly clean the vegetables of any soil that might adhere to them after being harvested; the apparatus consisting of an inclined rotatable drum having its inner wall provided with longitudinal cleats that serve to agitate the vegetables as they pass through the drum, and a water supply pipe with sprinkler heads arranged at intervals to spray the vegetables, a drain tank at the delivery end of the drum, and a slatted endless conveyer to rid the vegetables of the dirty water and deliver them to a suitable receptacle or packing table.

My invention will be described in detail hereinafter and illustrated in the accompanying drawings in which—

Figure 1:
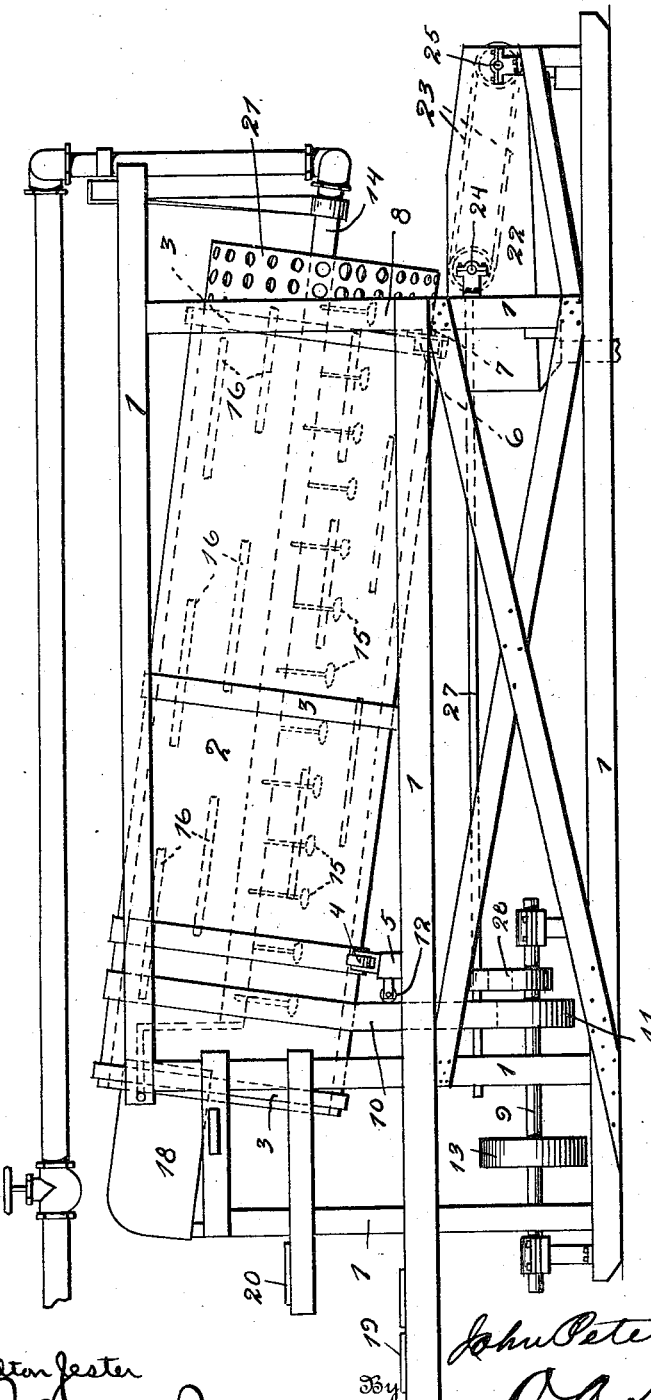
Figure 2:
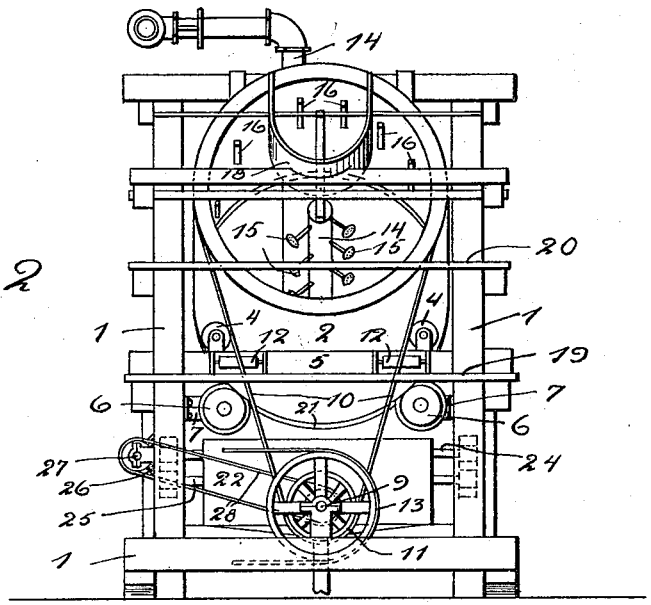
Figure 3:
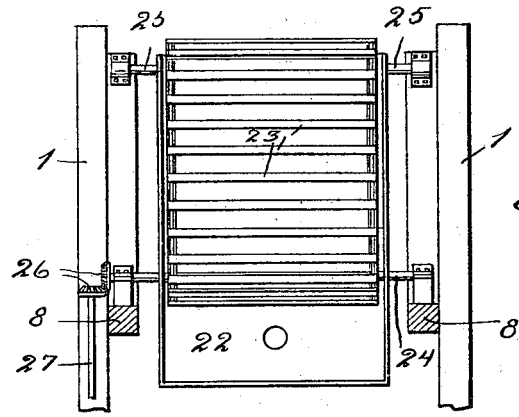
Figure 4:
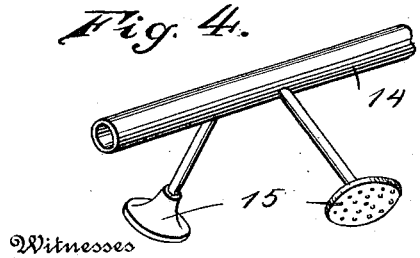
Figure 5:
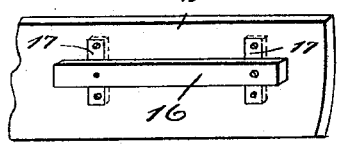

Figure 1 is a side view of my improved washer, Fig. 2, an end view, Fig. 3, a plane view of the conveyer and drain tank, Fig. 4, a detail view of the water pipe and sprinkler heads, and Fig. 5, a detail view of one form of fastening means for the agitator cleats.

In the drawings similar reference characters will be used to designate corresponding parts in the several views.

My improved vegetable washer is mounted on a frame 9, generally designated at 1 and having specific parts that will be hereinafter referred to and separately designated.

2 indicates an inclined drum formed of staves held together by means of hoops 3 or any other construction of drum may be substituted as desired, the object being the provision of an imperforate tubular cylinder to contain the vegetables to be washed and likewise hold the water used in cleansing the vegetables so that the vegetables are partly or wholly immersed in a stream of running water. Drum 2 is supported for rotation by means of rollers 4, journaled on a cross beam 5, said rollers traveling on the side of the drum adjacent to its uppermost or rear end, and by flanged rollers 6 journaled on arms 7 secured to end posts 8, said rollers 6 engaging the lowermost end of the drum and serving to hold it in the frame as well as permitting rotation thereof.

9 indicates a shaft journaled on the frame and geared to drum 2 by means of a belt 10 and pulley 11 secured to the shaft, 12 indicating rollers journaled on cross beam 5 and engaging the edge of the belt to hold it in position on the drum.

13 indicates the power pulley secured to shaft 9 and adapted to be driven by any suitable motor (not shown).

14 indicates a water supply pipe having its end extending into the drum 2 and furnished with sprinkler heads 15.

16 indicates cleats secured on the inner wall of the drum, the preferred method of fastening being, as shown in Fig. 5, metal plates 17 secured in recesses in the drum staves and having the cleats secured thereto by threaded or driven fastenings.

18 indicates a hopper for feeding the vegetables, to be washed, into the drum, 19 indicating a platform on which the operator stands, and 20 a shelf or table to support receptacles containing the vegetables. The delivery end of the drum is provided with a perforated extension 21 that serves as a screen to remove the water and dirt from the vegetables, said water and dirt falling into drain tank 22.

23 indicates a slatted conveyer mounted in tank 22 and positioned to receive the vegetables as they emerge from the extension 21 and carry them to a suitable receptacle or table to be sorted and packed. Conveyer 23 is mounted on shafts 24 and 25 suitably journaled on the frame, said conveyer being actuated by beveled gearing 26 connecting shaft 24 and a shaft 27, and shaft 27 is actuated by belt gearing 28 connecting it with shaft 9.

In operation the vegetables are inserted in the drum 2 through hopper 18 where they are washed by the water pouring from the sprinkler heads 15, the rotation of the drum and the cleats 16 therein causes the vegetables to be tumbled around in the drum so that they do not form in masses and each stalk or root is given equal attention. The inclined position of the drum causes the vegetables to be worked gradually to the lower end, and after passing over the perforated extension 21 the vegetables are deposited on the conveyer 23 and carried to a suitable receptacle as hereinafter stated.

Having thus described my invention what I claim is—

1. A vegetable washer comprising a supporting frame, an imperforate drum rotatably mounted on said frame, cleats secured upon the inner surface of said drum, said cleats extending longitudinally of the axis thereof and arranged spirally within the drum, a water supply pipe extending into the drum and a plurality of sprinkler heads connected therewith and extending outwardly from opposite sides thereof.

2. In combination with a supporting frame of a vegetable washer provided with rollers, an imperforate drum revolubly mounted on said frame, wear bands surrounding said drum and in contact with said rollers, cleats secured upon the inner surface of said drum longitudinally of its axis and arranged in staggered relation, a water supply pipe in said drum, a plurality of sprinkler heads connected with said pipe and extending therefrom in staggered relation.

3. In a vegetable washer having a supporting frame, an imperforate drum revolubly mounted on said frame, cleats secured upon the inner surface of said drum, said cleats extending longitudinally of the axis thereof and arranged spirally within the drum, a water supply pipe extending into the drum and a plurality of sprinkler heads connected therewith extending outwardly from the opposite sides thereof, and means for separating the soiled water and dirt from the fruit.

4. A vegetable washer comprising a supporting frame, an inclined imperforate drum mounted on said frame, cleats secured upon the inner surface of said drum longitudinally of its axis, said cleats being arranged spirally within the drum, a water supply pipe extending into the drum and a plurality of sprinkler heads connected therewith within said drum, and means for discharging the soiled water and dirt from said drum separately from said fruit, said means comprising a perforated extension on the lower end of said drum.

In testimony whereof I hereto affix my signature in the presence of two witnesses.

JOHN PETER MARLIN.

Witnesses:
M. D. CHAMBERLIN,
V. H. WILSON.